May 5, 1931.  J. F. LYONS ET AL  1,804,358

ADJUSTABLE HOSE CLAMP

Filed April 26, 1930

John F. Lyons and
Melvin S. Perkins
INVENTORS

BY Victor J. Evans
ATTORNEY

Patented May 5, 1931

1,804,358

UNITED STATES PATENT OFFICE

JOHN F. LYONS AND MELVIN S. PERKINS, OF KEENE, NEW HAMPSHIRE

ADJUSTABLE HOSE CLAMP

Application filed April 26, 1930. Serial No. 447,632.

This invention relates to a clamp for clamping the end of a rubber hose to a supply pipe or faucet and one of the objects of the present invention is to provide a clamp which will be extremely simple in construction and which may be manufactured at a low cost and readily adapted to the hose even after the hose has been fitted to the pipe.

Anothr object of the invention is to provide a clamp for the purpose stated which may be readily adapted to hose of different diameters.

Another object of the invention is to provide a clamp of the class referred to which may be firmly adjusted to grip the hose without any likelihood of marring or damaging the hose.

This invention also consists in certain other features of construction and in the combination and arrangement of the several parts, to be hereinafter more fully described, illustrated in the accompanying drawing, and specifically pointed out in the appended claims, it being understood of course that minor changes may be made so long as they fall within the scope of the claims.

In describing our invention in detail, reference will be had to the accompanying drawing, wherein like characters denote like or corresponding parts throughout the several views, and in which:—

Figure 1:
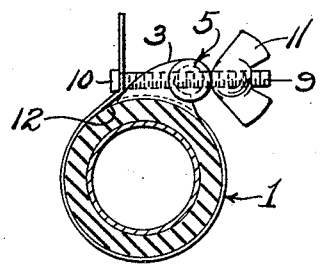
Figure 1 is a view in side elevation of the clamp, the hose and pipe being shown in section.
Figure 2:
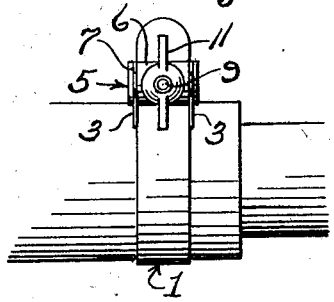
Figure 2 is a view in elevation of the device looking at one side thereof.
Figure 3:
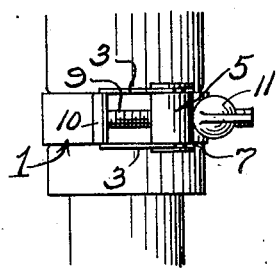
Figure 3 is a top plan view of the device applied.
Figure 4:
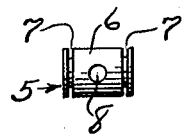
Figure 4 is a view in elevation of an element of the device.

The clamp embodying the invention comprises a band which is formed from resilient sheet metal and is indicated in general by the numeral 1 and this band is formed with a series of openings 2 extending longitudinally of one end portion of the band. The opposite end of the band is provided with lateral extensions which are bent up so as to provide ears 3, each of which is formed in its rear side with a substantially semi-circular notch 4. These ears occupy parallel planes and a fulcrum element 5 which comprises a cylindrical body 6 of metal is mounted between the ears by the engagement of the walls of the notches 4 in circumscribing grooves 7 formed in the said elements near the ends thereof.

The element is likewise provided with a diametric opening 8, this opening being located midway the ends of the element. The numeral 9 indicates a bolt having a T-head 10 and this bolt is fitted through one or another of the openings 2, depending upon the diameter of the hose to be clamped, and the band is disposed about the hose and the bolt is fitted through the opening 8 in the fulcrum element 6, it being understood that this element is capable of rotative movement sufficient to provide for proper fitting of the bolt through the opening therein. A wing nut 11 is fitted to the bolt and is adapted to be rotated so as to bind against the fulcrum element 6 and it will now be evident that by adjusting this nut the band will be effectually tightened.

Figure 5:
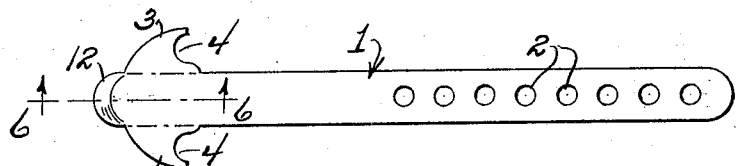
Figure 5 is a plan view of the band of the clamp.
Figure 6:
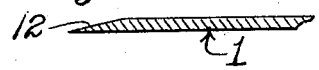
Figure 6 is a detail longitudinal sectional view on the line 6—6 of Figure 5 looking in the direction indicated by the arrows.
Figure 7:
Figure 7 is a side elevation of the adjusting screw shown in the embodiment of Figures 1, 2 and 3 of the drawings.

In order to provide against any offsetting of the portion of the band which extends over that end of the band at which the ears 3 are formed, this end of the band, at the outer side thereof is beveled as indicated by the numeral 12 and as best shown in Figures 5 and 6 of the drawings.

It will be understood at this point that the clamp may be readily applied to the hose and tightened about the same and that there is no likelihood whatsoever of any mutilation of the hose regardless of how tightly the band may be caused to bind about the same.

Figure 8:
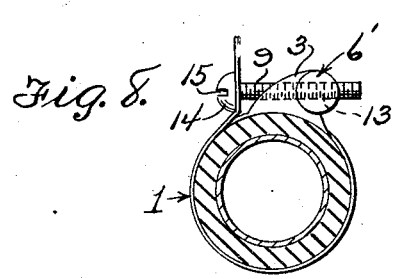
Figure 8 is a view similar to Figure 1 illustrating a modified form of the invention.

In the embodiment of the invention shown in Figure 8 of the drawing, the structure is identical with that shown in the previously described figures and therefore parts shown in this figure, corresponding to parts in the other figures are indicated by the same reference numerals, primed. The only difference in this form over the previously described form is that the fulcrum element 6′ is formed with a threaded opening 13 and in this embodiment the screw 9, instead of being provided with a T-head such as the head 10 and a nut 11, is provided with the usual rounded head 14 having the usual groove 15 therein for the application of a screw driver, it being understood that in this embodiment the band is tightened about the hose by the application of a screw driver to the head of the bolt 9.

What we claim is:—

1. A hose clamp comprising a band having an opening in one end, a fulcrum element at the other end of the band having a threaded opening therein and spaced circumferentially arranged grooves at opposite ends of the fulcrum member, spaced means carried by the band and receivable within the grooves, and a screw fitted through the opening in the band and threaded through the opening in the fulcrum element and adjustable to tighten the band about a hose to which it is applied.

2. A hose clamp comprising a band member in the form of a strip of resilient sheet metal, the strip being provided in one end portion with a longitudinal series of openings, ears outstanding from the sides of the strip at the other end thereof and each formed with a substantially semi-circular notch, a cylindrical fulcrum element, having circumscribing grooves at its ends, disposed between the ears with its grooved ends seating in the notches in the ears, the said fulcrum element having a diametric opening therein, and a bolt fitting the openings in the strip and fulcrum element and adjustable to clamp the strip about a hose.

In testimony whereof we affix our signatures.

JOHN F. LYONS.
MELVIN S. PERKINS.